(12) United States Patent
Harren et al.

(10) Patent No.: US 11,941,142 B2
(45) Date of Patent: Mar. 26, 2024

(54) DEDICATED SQL SERVICES FOR CROSS-SYSTEM SQL ACCESS TO AN APPLICATION-SERVER-MANAGED DATABASE

(71) Applicant: SAP SE, Walldorf (DE)

(72) Inventors: Arne Harren, Walldorf (DE); Marco Haupt, Biblis (DE); Helmut Prestel, Bad Schoenborn (DE); Rolf Hammer, Karlsruhe (DE); Christiane Kettschau, Leimen (DE); Kai Baumgarten, Rauenberg (DE); Diego Sebastian Will, Heidelberg (DE); Minh-Khanh Do, Heidelberg (DE); Timm Falter, Sinsheim-Hilsbach (DE); Frank-Martin Haas, Wiesloch (DE); Kilian Kilger, Dossenheim (DE)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 17/389,548

(22) Filed: Jul. 30, 2021

(65) Prior Publication Data
US 2023/0030785 A1 Feb. 2, 2023

(51) Int. Cl.
*G06F 16/25* (2019.01)
*G06F 21/62* (2013.01)
*H04L 9/40* (2022.01)

(52) U.S. Cl.
CPC ........ *G06F 21/6227* (2013.01); *G06F 16/256* (2019.01); *G06F 16/258* (2019.01); *H04L 63/0815* (2013.01); *H04L 63/0823* (2013.01)

(58) Field of Classification Search
CPC ............................ G06F 16/256; G06F 16/258
See application file for complete search history.

(56) References Cited

U.S. PATENT DOCUMENTS

| | | | | |
|---|---|---|---|---|
| 2016/0217159 A1* | 7/2016 | Dahan | ..................... | G06F 16/21 |
| 2017/0147656 A1* | 5/2017 | Choudhary | ........... | G06F 16/256 |
| 2019/0197174 A1* | 6/2019 | Kim | ...................... | G06F 16/258 |
| 2019/0347271 A1* | 11/2019 | Adamut | .................. | H04L 67/01 |
| 2021/0174238 A1* | 6/2021 | Song | ................. | G06F 16/24542 |
| 2021/0209077 A1* | 7/2021 | Snellman | .............. | G06F 16/219 |

* cited by examiner

*Primary Examiner* — Dangelino N Gortayo
(74) *Attorney, Agent, or Firm* — Buckley, Maschoff & Talwalkar LLC

(57) ABSTRACT

Methods for using SQL statements to access an application-server-managed database are disclosed herein. In some embodiments, a user sends, either directly or indirectly (i.e., remotely) a SQL statement from an ODBC application or server, respectively, to an application server that preprocesses SQL statements for accessing data from a centralized database. The application server may have a SQL endpoint, and access to the SQL endpoint may be determined by a user's logon credentials, a user's presentation of a SAML token, or a user's presentation of a valid certificate. The application server may then parse the SQL statement and determine the user's authorization to access certain objects in the centralized database based on a SQL handler design-time configuration. A result from the statement may be sent back to the user either directly or indirectly and exposed.

20 Claims, 6 Drawing Sheets

DEDICATED SQL SERVICES FOR CROSS-SYSTEM SQL ACCESS TO AN APPLICATION-SERVER-MANAGED DATABASE

BACKGROUND

1. Field

Embodiments of the present teachings relate to accessing data from a database managed by an application server. More specifically, embodiments relate to accessing data from an application-server-managed database by routing Structured Query Language (SQL) statements through an application server using concepts purely based on metadata, without requiring external configuration.

2. Related Art

To avoid difficulties inherent in maintaining multiple databases within the same organization, many businesses have concentrated data in a centralized database. Centralized databases are often managed by application servers, which serve to store and process the data. As such, application servers can provide application functionality for users who wish to access a centralized database.

Data analysts, however, do not want to log into an application server to access the data; they want to use SQL statements directly. Bypassing the application servers, however, presents several issues. For example, the names and internal structures of the database objects are not stable, especially when they are upgraded using zero downtime upgrades. Also, because the lifecycles of the database objects are managed by the application server, certain objects the user attempts to access may not yet exist or may be outdated. Data inside a centralized database may also be type-mapped differently than what is displayed by the application server. Moreover, views might contain implicit access to session variables which are only set when the view is accessed from the application server. And, in addition, direct access to the centralized database bypasses the security mechanisms instituted in the application server.

What is needed are systems and methods for accessing data within a centralized database using SQL statements while still reaping the security and organizational benefits of an application server.

SUMMARY

Embodiments described herein allow users to send SQL statements through a SQL endpoint in an application server that manages a centralized database, thus allowing users to access data within a centralized database using SQL statements while still reaping the benefits of security and data stability provided by an application server. A first embodiment is directed to a method of accessing data from an application-server-managed database in an application-server-managed database system (ASMDS) by routing SQL statements through an application server. The method comprises the steps of receiving a SQL statement by a SQL endpoint in the application server, handling the SQL statement in connection with a design-time configured SQL handler comprising, a service definition listing objects to be exposed, and a service binding comprising configuration data to expose said objects, wherein a SQL service artifact associated with the service binding is generated upon activation of the service binding, parsing the SQL statement and extracting schema names referenced in the SQL statement, in response to determining that data access is permitted, retrieving centralized data corresponding to the SQL statement from a centralized database, and exposing the service binding to a user as a schema containing the centralized data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
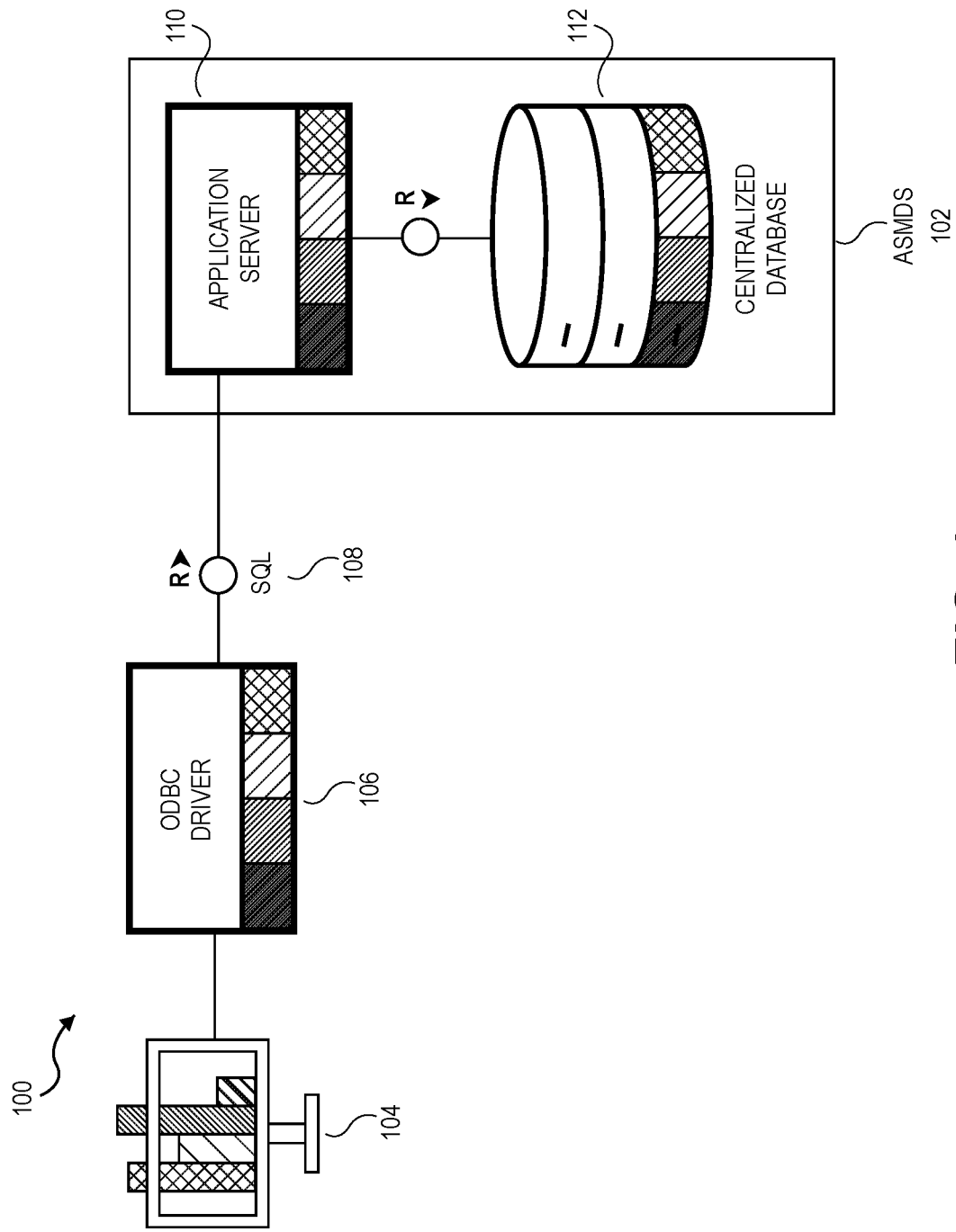
FIG. 1 depicts an exemplary schematic of an ASMDS directly receiving a SQL statement.

The drawing figures do not limit the claimed scope to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the invention(s) herein described. Other embodiments can be utilized, and changes can be made without departing from the claimed scope. The following detailed description is, therefore, not to be taken in a limiting sense. The scope of the claimed invention(s) is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, embodiments of the invention can include a variety of combinations and/or integrations of the embodiments described herein.

Generally, embodiments may be directed to systems, computerized methods, or computer programs for routing SQL statements through an ASMDS. A user may formulate a SQL statement containing objects exposed by a service definition according to the configuration data and network protocol specified in the service definition. The ASMDS may receive the SQL statement from a user either directly or remotely by routing the SQL statement through an ODBC (Open Database Connectivity) driver. The ODBC driver may transmit the SQL statement through a SQL endpoint in an application server. Access to the application server may be determined by a valid certificate presented by the application server to a SQL PSE stored in the consuming database or by a valid certificate transmitted to the application server from the consuming database via the ODBC driver. An associated SQL service artifact may be generated in the application server to match the service binding. The SQL service artifact may be checked by the application server to determine whether, given the user's authorization credentials, the user may access the data requested in the SQL statement. If user access is denied either at the SQL endpoint or upon checking the SQL service artifact, the requested data may not be returned.

Assuming authorization, the application server may send the SQL statement to a centralized database where the SQL statement may be executed. A result from the executed statement may be sent back to the application server and then back to the user, either directly or remotely. The service binding may be exposed to the user as a virtual schema, with the virtual schema containing objects referenced in the service definition. If the SQL statement contains instructions to do so, a database may join locally stored data with data accessed remotely and expose the locally stored and remotely accessed data.

FIG. 1 depicts an exemplary schematic 100 of an ASMDS 102 directly receiving a SQL statement. The ASMDS 102 may comprise an application server 110 and a centralized database 112. In some embodiments, the application server 110 is a plurality of application servers. In some embodiments, the centralized database 112 is a plurality of centralized databases. The ASMDS 102 may be accessed directly using a front-end tool 104 (e.g., an ODBC-compliant application) configured with an ODBC remote connection to send a SQL statement directly to a SQL endpoint 108 at the application server 110. The SQL endpoint 108 may be built on existing infrastructures like WebSockets and communication scenarios and arrangements. A SQL statement may be routed through the application server 110 and executed in the centralized database 112. A result of the executed SQL statement may be sent back through the application server 110 which sends the result to the front-end tool 104.

Figure 2:
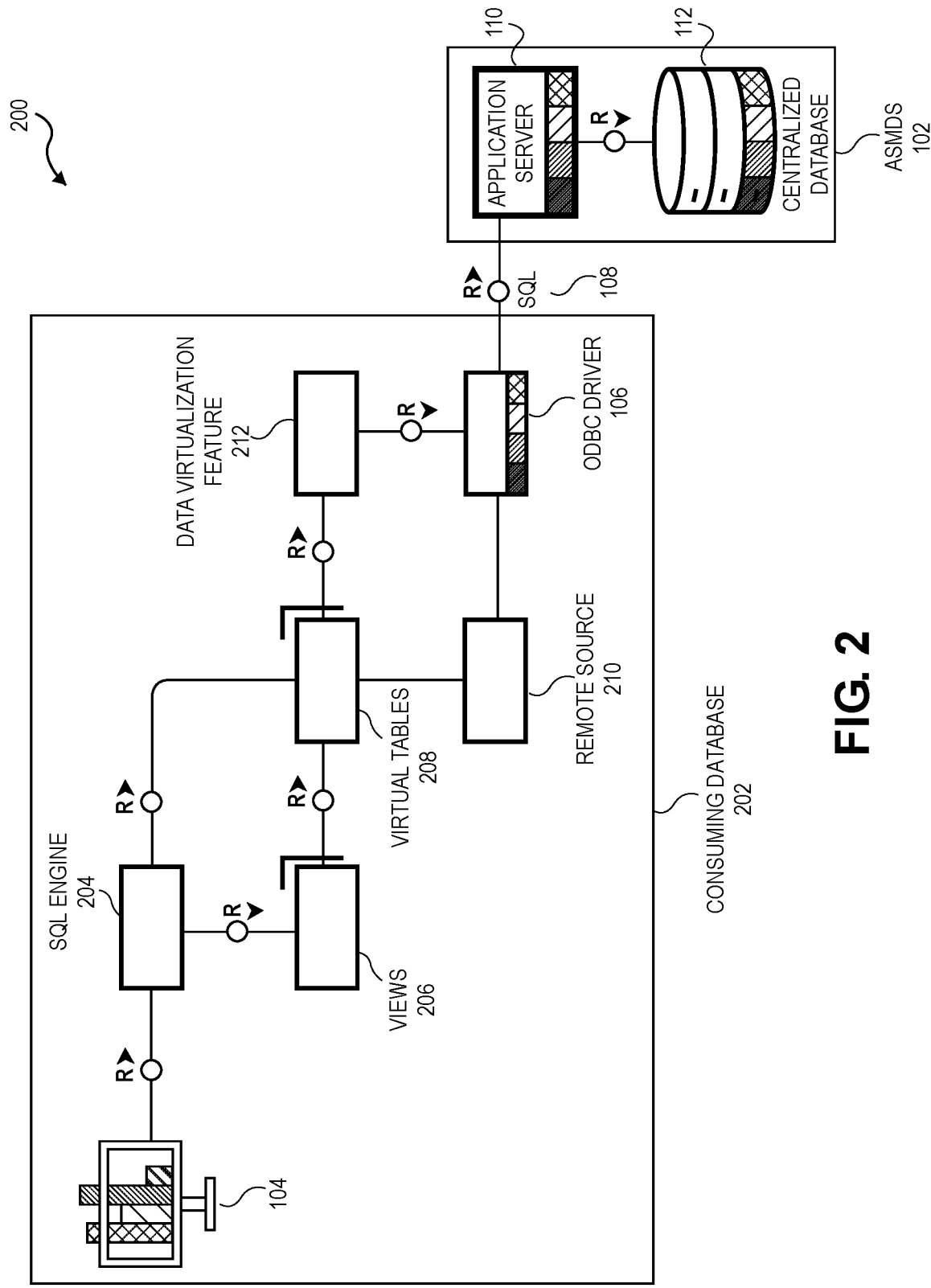
FIG. 2 depicts an exemplary schematic of an ASMDS receiving a SQL statement remotely via a cloud database.

FIG. 2 depicts an exemplary schematic 200 of the ASMDS 102 receiving a SQL statement remotely via a consuming database 202. In one embodiment, the consuming database 202 is a cloud database. In another embodiment, the consuming database 202 is an on-premises database. The consuming database 202 may include a SQL engine 204 that may interpret a SQL statement. A remote source 210 may be used to allow the consuming database 202 to connect to the ASMDS 102 remotely. The consuming database 202 may contain a data virtualization feature 212 (for example, SAP Smart Data Access) which allows for configuring a connection to the ASMDS 102 remotely. SQL statements may be routed through an ODBC driver 106, which both translates between ODBC and the application server 110 and handles the technical connection between the consuming database 202 and the application server 110. A SQL statement may be sent through the SQL endpoint 108 and processed in the ASMDS 102.

A user may expose certain views 206 stored in the ASMDS 102 from inside the consuming database 202 via implicit or explicit virtual tables 208. In some embodiments, the consuming database 202 and/or the application server 110 may store data locally through, for example, caching. A user may accordingly formulate a SQL statement that involves accessing both local and remote data. The consuming database 202 may formulate a subquery that relates to the application server 110 to receive remotely stored data, and the consuming database 202 may join the remotely accessed data with the locally stored data.

In some embodiments, a SQL statement may also specify that the locally stored data be retrieved only if the data has been locally stored for a specified period of time. If the data has been stored for less than the specified period of time, the consuming database 202 and/or application server 110 may provide the data from its cache. If the data has been stored for longer than the specified period of time, the data may be accessed remotely from the centralized database.

Figure 3:
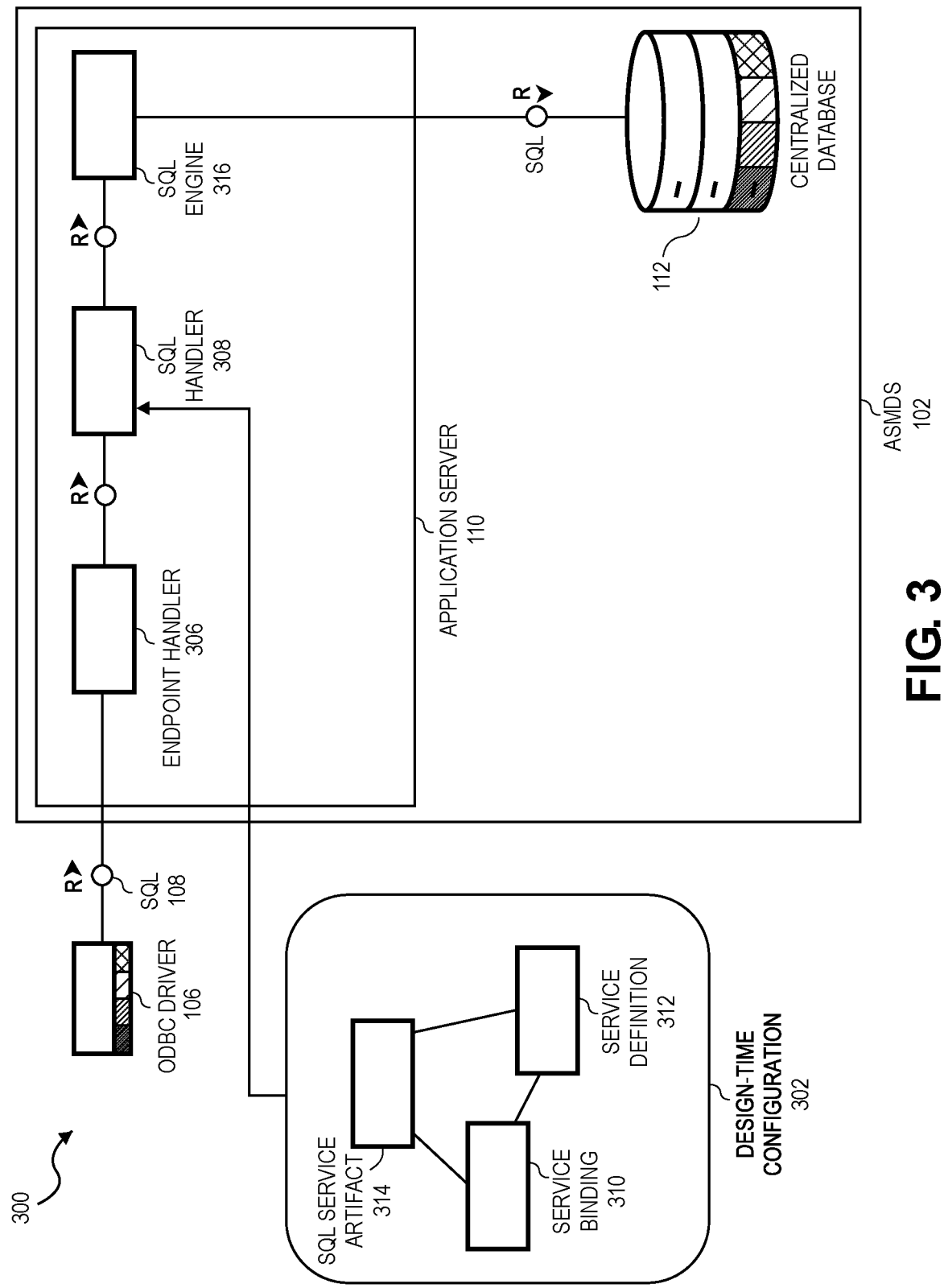
FIG. 3 depicts an exemplary schematic of an ASMDS receiving a SQL statement, either directly or remotely.

FIG. 3 depicts an exemplary schematic 300 of the ASMDS 102 receiving design-time configuration 302, either directly or vial distributed configuration. In some embodiments, design-time configuration 302 may be associated with a design-time object called a "service definition" 312 and a design-time object called a "service binding" 310. The service definition 312 may comprise a list of objects an administrative user wishes to expose. The objects may include, but are not limited to, tables, views, table functions or hierarchies, and procedures. The objects may have a classification that controls whether they can be exposed via the SQL endpoint 108 based on design-time metadata of the objects. This classification may determine whether the objects can be used within the service definition 312 that has service binding 310 of type SQL.

The service binding 310 may comprise configuration data and protocol to expose objects contained in the service definition 312. The configuration data may include a service name (which may default to the name of the service definition) and a SQL binding type. The name of the service binding 310 may be exposed to the user as a virtual schema which contains the objects referenced in the service definition 312. In some embodiments, the service binding 310 is a plurality of service bindings. An exposed service binding 310 which contains the objects referenced in the service definition 312 may be referred to as a "SQL service." The service binding 310 may also implement semantic consistency checks for the underlying service definition 312 with respect to the protocol used. The service binding 310 user interface may allow the user to open a data preview for the service binding 310. For a SQL-typed service binding 310, a SQL console may be offered where queries on the exposed objects could be executed for simple testing purposes. The objects exposed through the service binding 310 of type SQL may be considered Application Programming Interface (API) objects for consumption by external systems. The service binding 310, therefore, may use the type category API. Both technical API access and business user API access may be supported for the service binding 310.

A SQL service artifact 314 which corresponds to the service binding 310 may be generated once the service binding 310 is activated. The SQL service artifact 314 may bear the same name as the service binding 310. The SQL service artifact 314 may be used at run-time for authorization handlings.

A SQL handler 308 in the application server 110 may process SQL statements based on design-time configuration 302 in the context of the entities contained in the corresponding service definition 312. The runtime aspects of the SQL handler 308 may be defined by the SQL service artifact 314.

For example, a user may access an Advanced Business Application Programming (ABAP) system (e.g., a High-Performance Analytic Appliance (HANA) database managed by an ABAP application server) through a HANA cloud database. The user may wish to expose two Core Data Service (CDS) views in the ABAP system—I_FOO and I_BAR—both containing a related ID field and some other fields. The user may begin by creating two service definitions, with the first one exposing I_FOO, the second one exposing I_BAR, and both renaming the CDS views.

```
• define service DEF_X {
    expose I_FOO AS A_FOO;
}
• define service DEF_Y {
    expose I_BAR AS A_BAR;
}
```

Based on the service definitions, the user may create two service bindings of type SQL. BIND_X can link to the service definition DEF_X, and BIND_Y can link to the service definition DEF_Y. For both bindings, a SQL service artifact bearing the same name can be created.

The SQL query may return schemas from the database that correspond to the service bindings. For example, the SQL query would return two virtual schemas—BIND_X and BIND_Y—where BIND_X contains A_FOO and BIND_Y contains A_BAR.

In the HANA cloud database, it would now be possible to create virtual tables for A_FOO and A_BAR and to formulate a query with a join between them. The result would be the following query for the ABAP system:
select . . . from
"BIND_X"."A_FOO" inner join "BIND_Y"."A_BAR"
    on     "BIND_X"."A_FOO"."ID"="BIND_Y".
    "ABA_R"."ID"

The ABAP application server may then parse the query. The ABAP application server may also extract the SQL service artifacts and check the SQL service artifacts against the user's authorizations.

The corresponding service definitions DEF_X and DEF_Y may then be resolved. The Objects A_FOO and A_BAR may also be resolved to their real object names: I_FOO and I_BAR, respectively.

The resulting query, then, is:
select . . . from
    I_FOO INNER JOIN I_BAR
        ON I_FOO.ID=I_BAR.ID
where external names have been resolved to their real names.

In some embodiments, a user may call procedures on an ASMDS 102 using SQL mechanisms like, for example, INSERT, UPDATE, DELETE, and use transaction control statements like TRANSACTION, COMMIT, and/or ROLLBACK. For example, a function in an application server 110 that implements UPDATE logic could be exposed as a SQL object, thus permitting the user to call an UPDATE procedure on an ASMDS 102 using a SQL statement.

SQL statements may be routed through the SQL endpoint 108 in the application server 110. An endpoint handler 306 may be attached to the SQL endpoint 108. The endpoint handler 306 may route the SQL statement to the SQL handler 308. The SQL handler 308 may parse the given SQL statement and extract the schema names referenced in the SQL statement. The SQL handler 308 may also check that the user has the authorizations for the service bindings 310 contained in the SQL statement and may process the SQL statement in the context of the entities contained in the corresponding service definitions 312. The SQL handler 308 may generally handle the following nonexclusive technical aspects: statement execution; parameter handling; result set processing; covering SELECT, CALL, INSERT, UPDATE, and DELETE statements; statement preparation, including handling of parameter metadata like data types of input parameters; and discovery mechanisms, including metadata of exposed SQL objects.

The SQL statement may be sent from the SQL handler 308 to a SQL engine 316. The SQL engine 316 may send the SQL statement to the centralized database 112 where the SQL statement may be executed. A result may be sent back to the application server 110, which may send the result to a user either directly or remotely.

In some embodiments, the centralized database 112 uses character-based fields to store dates and time values. When a user accesses character-based dates and times, the ODBC driver 106 can be configured to retrieve the character-based dates and times and convert them to date or time formats, respectively, for viewing in the consuming application. E.g., the date 19991201 would be converted to 01-12-1999 in the consuming database, and the time 091250 would be converted to 09:12:50 in the consuming database. Some databases did not have rounding-free data types for decimal values in the past. Therefore, some embodiments simply use the integer data types and shift the decimal place. For example, 50 Uganda Shilling (UGX) is the coin with the lowest value. It could thus be stored as the numerical value 5 and the factor-of-10. As a result, careless access to the database would return the erroneous value of 5 UGX. The application server, however, is aware of the procedure. A user may specify in the SQL statement to retrieve currencies in a way that shifts the currencies to their proper quantities. In some embodiments, the centralized database 112 stores language codes as one-digit characters. A user may specify in the SQL statement to retrieve language codes in a way that converts the language codes to an ISO code (e.g., ISO 3166-1 alpha-2). In some embodiments, it may be up to the user to determine whether or not the retrieved data will be converted to a semantic format or remain as raw data. In some embodiments, such date conversions may be implemented on the server-side, e.g., in the application server. In some alternative embodiments, such conversions may be partially performed at the client and partially on the server.

In some embodiments, a technical user may have access to all objects contained in a single client's centralized database 112, whereas a business user's access to certain objects may be limited. In other embodiments, a technical user may have access to all objects in all clients' centralized database 112. In some other embodiments, access controls limit the access to certain rows in particular databases for business users. In these embodiments, business users may only be provided access to those rows corresponding to a particular attribute associated with the business user. For example. A business user in a particular cost center may have access only to those rows corresponding to the cost center of the business user. Similarly, technical users may have access to an entire database, or the technical user may have an identifier, such as a client identifier such that the technical user only has access to those tables, records and/or rows corresponding to the particular identifier associated with the technical user.

Figure 4:
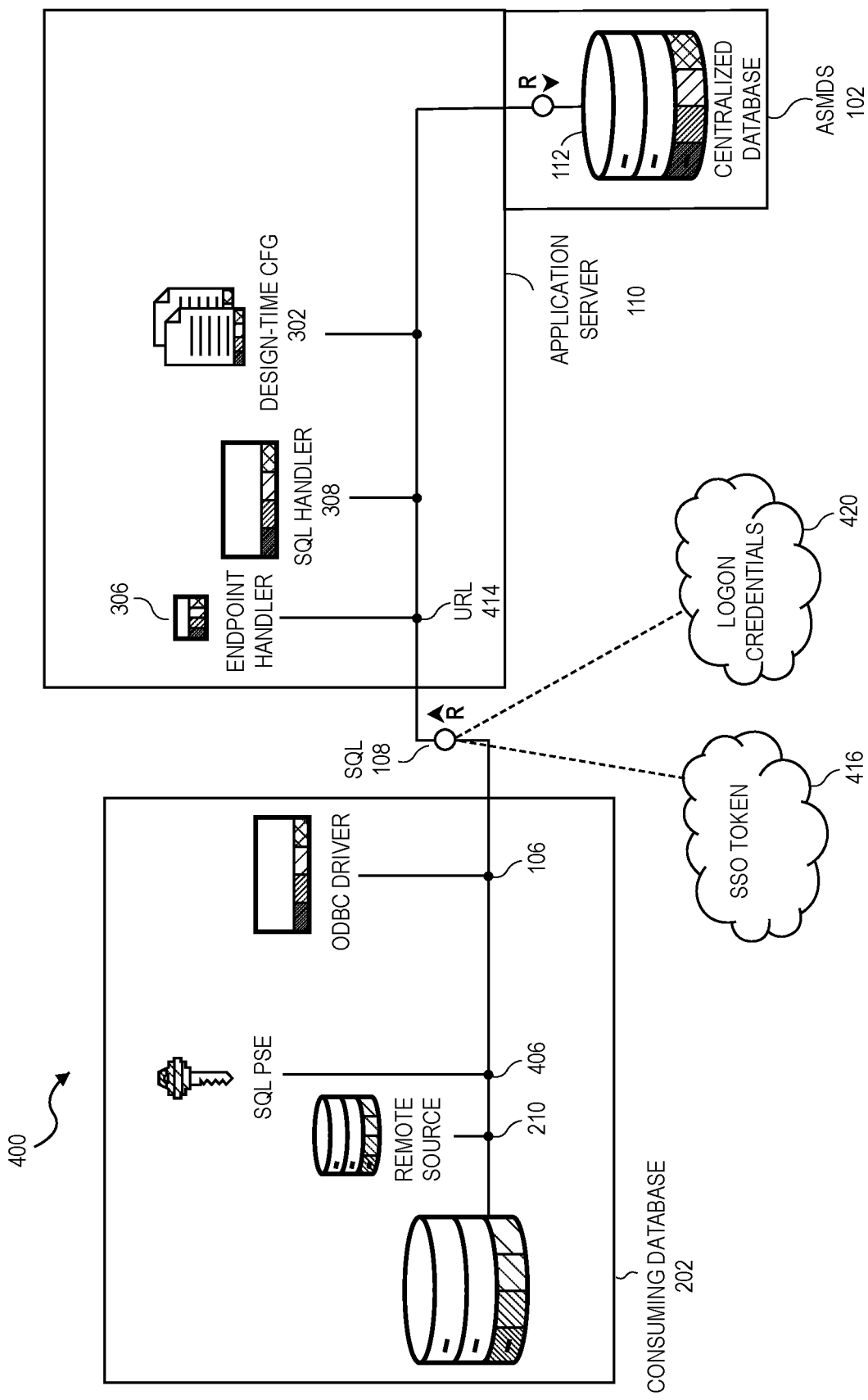
FIG. 4 depicts an exemplary schematic of user authorization and authentication when accessing an ASMDS.

FIG. 4 depicts an exemplary schematic 400 of user authorization and authentication when accessing the ASMDS 102. In one embodiment, the remote source 210 in the consuming database 202 may connect to the ASMDS 102 via a dedicated URL 414. The consuming database 202 may include a SQL PSE 406, which stores certificates granting access to the SQL endpoint 108 and/or objects contained in the ASMDS 102.

The SQL PSE 406 may be attached to the remote source 210. When a connection between the ASMDS 102 and the consuming database 202 is opened, the consuming database 202 may pass the certificates to the ODBC driver 106 to communicate to the ASMDS 102 the trusted certificates, establishing a secure communication to the application server 110. The application server 110 may receive the trusted certificates from the ODBC driver 106. In some embodiments, the application server 110 presents its certificate to the ODBC driver 106 and the ODBC driver 106 may validate the identity of the application server 110 based on the application's trusted certificates.

The ODBC driver 106 may also present its own certificate to the application server 110, and the application server 110 may validate the ODBC driver's 106 certificate therewith. The endpoint handler 306 may determine whether the user has privileges to use the SQL endpoint 108 in the application server 110.

In some embodiments, access to the SQL endpoint 108 may be determined by, for example, a user's presentation of a valid SSO token 416 or a user's valid logon credentials 420 (e.g., a username and password). In some embodiments, the SSO token 416 is received from a third-party identity provider, and the SSO token 416 may be, for example, a Security Assertion Markup Language (SAML) token, or a JSON Web Token (JWT). If the user does not have privileges to use the SQL endpoint 108 based on the logon credentials 420 or SSO token 416, the SQL statement may not be processed further. If the user does have privileges, the SQL statement may be processed.

The SQL service artifact 314 may be checked to determine whether, given the user's authorization credentials, the user may access the SQL service. In some embodiments, the SQL service artifact 314 is a plurality of SQL service artifacts. Once a SQL statement is parsed and the set of referenced schemas is extracted, the application server 110 may check the authorization of the SQL service artifact(s) 314 that corresponds to the SQL statement. For the referenced SQL service artifact 314, the corresponding service definition 312 may be resolved and the object names in the SQL statement may be checked against the exposed object names from the service definition 312. Objects not listed in the service definition 312 may not be accessible. Based on the resulting set of queried objects, record-level authorizations may be mixed into the SQL statement to restrict the set of queried records in the queried objects.

Authorization for SQL services may be assigned to technical users or business users. For technical users, authorizations for SQL services may be defined as part of a communication scenario definition. If a corresponding communication arrangement is created, a real technical user may be created, and the authorizations may be assigned to the technical user. Business users may receive their authorizations for SQL services via business roles or business catalogs.

In some embodiments, user authorization checks are performed on a regular basis. If user authorization changes, the change will be effective after the next authorization check is performed. For example, if an authorization check is performed every 10 minutes and an administrator revokes a user's privileges, the user will not be able to enjoy those revoked privileges 10 minutes after the administrator revoked the privileges. In some embodiments, revocation of privileges might be effective immediately.

In some embodiments, the user directly accesses a SQL service of the application server 110. In one of those embodiments, a user may be a business user whose credentials are used to logon to the SQL service. The business user would be visible to the application server 110 as an application user. As an application user, features such as read access logging and privilege checks may be performed. To the centralized database 112, the business user would be the session user. In another embodiment, the user may be a technical user. The technical user would be used as the logon user for the SQL service and would be used as the application user on the centralized database 112.

In some embodiments, the user accesses the SQL service of the application server 110 indirectly. In one of those embodiments, a business user accesses the ASMDS 102 which connects to a SQL service and uses the same, or even a mapped, named user as the logon user for the SQL service. In another embodiment, the same is accomplished with a technical user. In either embodiment, the application server 110 may maintain secondary credentials (e.g., a username and password) for remote users. The application server 110 may also utilize the SSO token 416 to logon to the SQL service.

In some embodiments, an application may be stacked on top of a consuming database, where the application itself uses technical users to connect to a centralized database 112. For example, the ASMDS 102 may be integrated as a remote source 210 in the consuming database 202 and then consumed by an application on top of the consuming database 202. If a business user connects as a logon user to the application, the application may connect to the consuming database 202 with a technical user as the session user and propagate the business user via an application user session variable to the ASMDS 102. For an SSO connection to the SQL service of the ASMDS 102, a logon user for the SQL service may be derived from the application user session variable. An application user variable set by the application via the trusted SSO token 416 may be used to create an end-to-end chain of trust.

In another embodiment, a technical user may be used to connect to the ASMDS 102, and the name of the business user from the application user variable may be propagated to the ASMDS 102. This method may be used to apply a more restrictive record-level filtering on the returned data. As a limitation, record-level filtering may be restricted to a WHERE clause on the objects exposed by the service definition 312—i.e., no internal tables are accessible.

Figure 5:
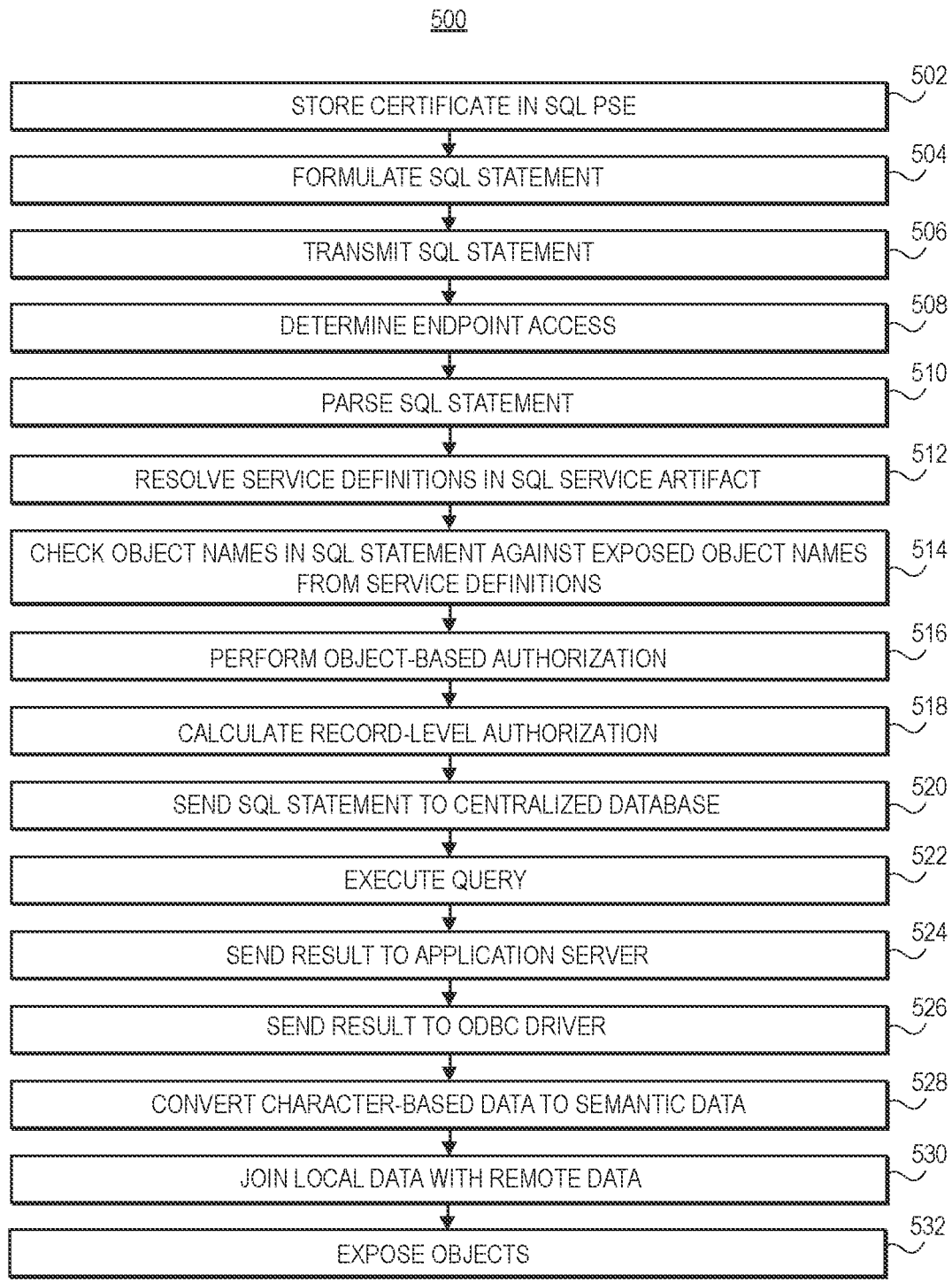
FIG. 5 depicts an exemplary method of using SQL statements to access data stored in a centralized database that is managed by an application server.

FIG. 5 depicts an exemplary method of using a SQL statement to access data stored in the centralized database 112 that is managed by the application server 110, generally referenced by the numeral 500. At step 502, the SQL PSE 406 containing trusted certificates may be stored either on the consuming database 202 that indirectly accesses the ASMDS 102 or on the front-end tool 104 that directly accesses the ASMDS 102, as described in embodiments above. Step 502 may be optional.

At step 504, a user may formulate the SQL statement as described in embodiments above. The SQL statement may be processed on the basis of design-time configuration 302, including the service definition 312 which comprises the names of objects a user wishes to expose. The objects may include, but are not limited to, tables, views, table functions or hierarchies, and procedures. The design-time configuration 302 may also include the service binding 310 which contains configuration data and protocol to expose objects contained in the service definition 312.

At step 506, the SQL statement may be sent to the application server 110 as described in embodiments above. This may be done directly using the front-end tool 104 or indirectly using the consuming database 202. In either case, the SQL statement may be transmitted through the ODBC driver 106, which both translates between ODBC and the application server 110 and handles the technical connection between the application server 110 and the consuming tool (i.e., the front-end tool 104 or the consuming database 202). It is also optional to send, along with the SQL statement, the SQL PSE 406.

At step 508, a user's access to the SQL endpoint 108 may be determined as described in embodiments above. In one embodiment, the consuming database may store certificates on the SQL PSE, and the ODBC driver may communicate to the application server the trusted certificates. In another embodiment, the application server may transmit its own certificates to the consuming database where the certificates are matched with the SQL PSE. The application server 110 may also receive the valid SSO token 416 through a third-party identity provider. For example, a user may log in to a third-party SSO server and receive a token (e.g., a SAML token) which is presented to the application server 110. In another embodiment, the entry of valid logon credentials 420 (e.g., a username and password) may grant access. Step 508 may be optional.

At step 510, the SQL statement may be parsed within the application server 110 as described in embodiments above. In one embodiment, the SQL handler 308 parses the SQL statement and extracts schema names referenced in the SQL statement.

At step 512, the SQL handler 308 may resolve the service definition 312 in the SQL statement as described in embodiments above. At step 514, the SQL handler 308 may check the authorization of the SQL service artifact 314 that corresponds to the SQL statement as disclosed in embodiments above. For referenced SQL service artifacts 314, the corresponding service definition 312 may be resolved and object names in the SQL statement may be checked against exposed object names from the service definition 312. Objects not listed in the service definition 312 may not be accessible. Objects within the ASMDS 102 may have classifications indicating whether the objects can be exposed via the SQL endpoint 108. Step 514 may be optional.

At step 516, the SQL handler 308 may perform object-based authorization based on the resulting set of queried objects as described in embodiments above. Step 516 may be optional. At step 518, the SQL handler 308 may calculate record-level authorization to determine whether a user has authorization to access a particular record within a particular object. At step 520, the SQL statement may be sent to the centralized database 112 as described in embodiments above. At step 522, the SQL statement may be executed in the centralized database 112 as described in embodiments above. At step 524, a result of the executed SQL statement may be sent back to the application server 110, as described in embodiments above. At step 526, the result may be sent back to the front-end tool 104 in the case of a user directly accessing the ASMDS 102, or may be sent back to the consuming database 202 in the case of a user indirectly accessing the ASMDS, as described in embodiments above.

At step 528, data accessed from the centralized database 112 that is character-based may be converted to its corresponding semantic format as described in embodiments above. In one embodiment, character-based dates and times are converted to corresponding date and time formats, respectively. In another embodiment, one-digit language codes are converted to two-digit ISO codes. In another embodiment, currencies stored as quantities that are orders of magnitude less than the true values are converted to their true values. Step 528 may be optional.

At step 530, in the case of indirect access to the ASMDS 102, data accessed locally in the consuming database 202 may be joined with data accessed remotely in the centralized database 112 as described in embodiments above. In one embodiment, the consuming database 202 and/or application server 110 stores data locally through, for example, caching. If the SQL statement requests both locally and remotely stored data, the consuming database 202 may formulate a subquery that relates to the application server 110 to receive remotely stored data. The consuming database 202 may join remotely accessed data with locally stored data. Step 530 may be optional.

At step 532, the objects accessed from the centralized database 112 may be exposed either on a direct user's front-end tool 104 or a remote user's consuming database 202 as described in embodiments above. The service binding 310 may be exposed to a user as virtual schemas. The virtual schemas may contain the objects referenced in the SQL statement.

Figure 6:
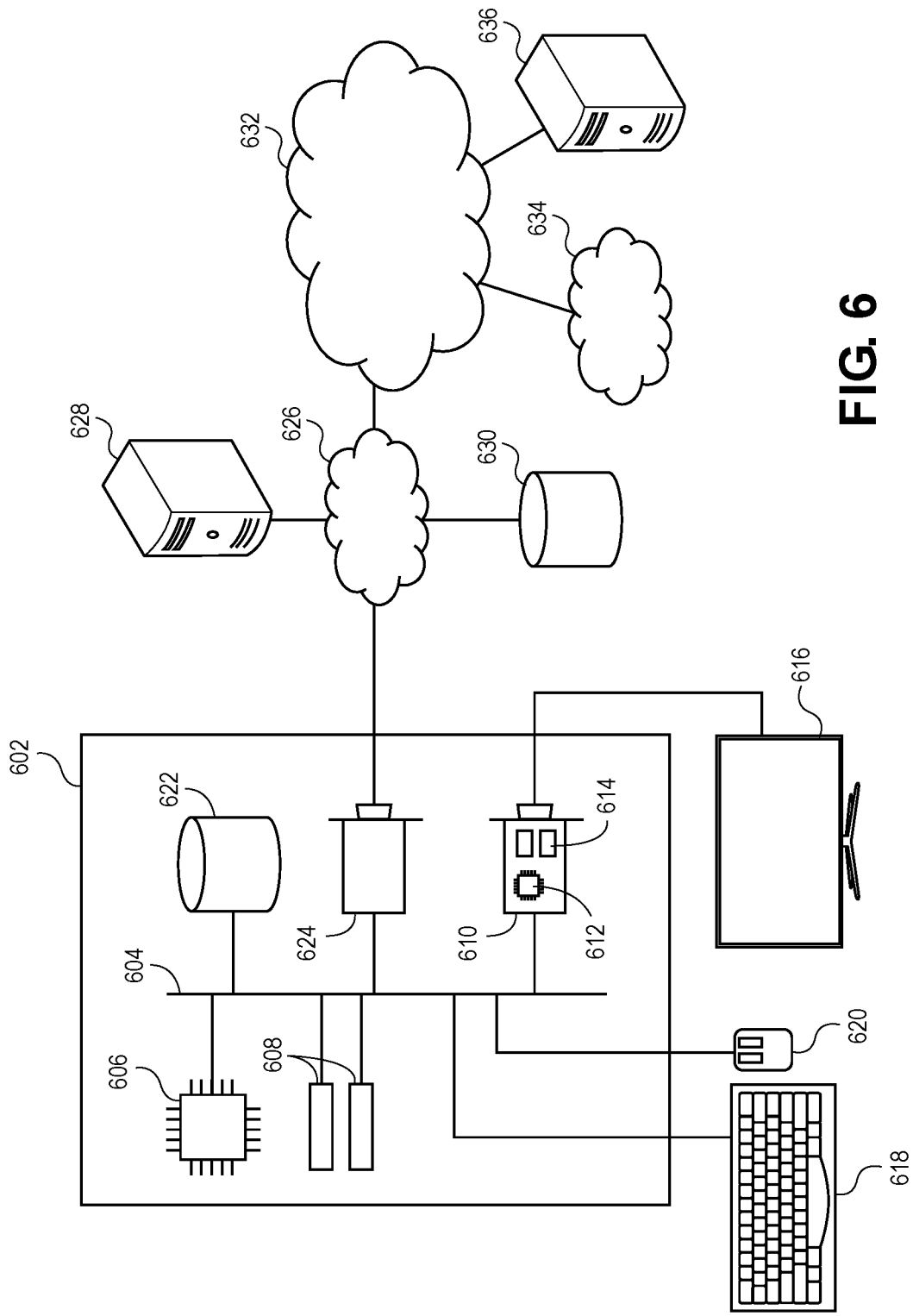
FIG. 6 depicts an exemplary hardware platform for embodiments.

FIG. 6 depicts an exemplary hardware platform that can form one element of certain embodiments of the invention. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. The RAM modules 608 may also be integrated into the CPU 606. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, 24 such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although embodiments of the invention have been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of accessing data from a database in an application-server-managed database system (ASMDS) by routing structured-query-language (SQL) statements through an application server, the method comprising:
   receiving, by the application server, a certificate from an Open Database Connectivity (ODBC) driver;
   receiving, from the ODBC driver, an SQL statement by a SQL endpoint in the application server;
   handling the SQL statement in connection with a design-time configured SQL handler comprising:
   a service definition listing objects to be exposed; and
   a service binding comprising configuration data to expose said objects;
   wherein a SQL service artifact associated with the service binding is generated upon activation of the service binding;
   parsing the SQL statement and extracting schema names referenced in the SQL statement;
   in response to validating the certificate and determining that data access is permitted, retrieving centralized data corresponding to the SQL statement from a centralized database; and
   exposing the service binding to a user as a schema containing the centralized data.

2. The method of claim 1, further comprising: permitting the user to call procedures on the ASMDS using the SQL statement, wherein the objects to be exposed are the procedures performed in the ASMDS.

3. The method of claim 1, further comprising: converting character-based data to semantic data by one of:
   converting the character-based data to the semantic data using an ODBC driver within an ODBC-connected application, or
   specifying in the SQL statement to convert the character-based data to the semantic data in the ASMDS.

4. The method of claim 1, further comprising: exposing the data from the database via implicit or explicit virtual tables in an ODBC-connected application.

5. The method of claim 1, further comprising: limiting user access to the SQL endpoint based on a user authentication and authorization of the user.

6. The method of claim 5, further comprising: performing the user authentication by one of:
   submitting valid logon credentials to authenticate the user, or
   receiving a valid Single Sign-On (SSO) token from a third-party identity provider to authenticate the user, or
   storing a valid certificate on a SQL Personal Security Environment (PSE) in an ODBC application, and transmitting the valid certificate to the application server, or
   storing a valid certificate on the application server, and matching the valid certificate to the SQL PSE in the ODBC application.

7. The method of claim 5, further comprising: limiting access to SQL services based on the authorization of the user by:
   checking the user's authorization for the SQL service artifact;
   resolving the service definition associated with the SQL service artifact;
   checking the objects in the SQL statement against the exposed objects from the service definition;
   wherein the exposed objects not listed in the service definition are not accessible; and
   performing record-level authorizations based on a resulting set of objects.

8. One or more non-transitory computer-readable media storing computer executable instructions that, when executed by a processor, perform a method of accessing data from a database in an application-server-managed database system (ASMDS) by routing SQL statements through an application server, the method comprising:.
   receiving, by the application server, a certificate from an Open Database Connectivity (ODBC) driver;
   receiving, from the ODBC driver, an SQL statement by a SQL endpoint in the application server;

handling the SQL statement in connection with a design-time configured SQL handler comprising:
a service definition listing objects to be exposed; and
a service binding comprising configuration data to expose said objects;
wherein a SQL service artifact associated with the service binding is generated upon activation of the service binding;
parsing the SQL statement and extracting schema names referenced in the SQL statement;
in response to validating the certificate and determining that data access is permitted, retrieving centralized data corresponding to the SQL statement from a centralized database; and
exposing the service binding to a user as a schema containing the centralized data.

9. The media of claim 8, wherein the computer-executable instructions are further executed to perform: permitting the user to call procedures on the ASMDS using the SQL statement, wherein the objects to be exposed are the procedures performed in the ASMDS.

10. The media of claim 8, wherein the computer-executable instructions are further executed to perform: converting character-based data to semantic data by one of:
converting the character-based data to the semantic data using an ODBC driver within an ODBC-connected application, or
specifying in the SQL statement to convert the character-based data to the semantic data in the ASMDS.

11. The media of claim 8, the computer-executable instructions are further executed to perform: exposing the data from the database via implicit or explicit virtual tables in an ODBC-connected application.

12. The media of claim 8, wherein the computer-executable instructions are further executed to perform: limiting user access to the SQL endpoint based on a user authentication and authorization of the user.

13. The media of claim 12, wherein the computer-executable instructions are further executed to perform: performing the user authentication by one of:
submitting valid logon credentials to authenticate the user, or
receiving a valid Single Sign-On (SSO) token from a third-party identity provider to authenticate the user, or
storing a valid certificate on a SQL Personal Security Environment (PSE) in an ODBC application, and transmitting the valid certificate to the application server along with the SQL statement to authenticate the user, or
storing a valid certificate on the application server, and matching the valid certificate to a SQL PSE in an ODBC application.

14. The media of claim 12, wherein the computer-executable instructions are further executed to perform: limiting access to SQL services based on the authorization of the user by:
checking the user's authorization for the SQL service artifact;
resolving the service definition associated with the SQL service artifact;
checking the objects in the SQL statement against the exposed objects from the service definition;
wherein the exposed objects not listed in the service definition are not accessible; and
performing record-level authorizations based on a resulting set of objects.

15. A system for accessing data in an Application-Server-Managed Database System (ASMDS) comprising:
an application server to receive a certificate from an Open Database Connectivity (ODBC) driver;
an database managed by the application server;
and ODBC-connected application used to connect to the ASMDS; and
one or more non-transitory computer-readable media storing computer executable instructions that, when executed by a processor, perform a method of accessing the data from the application-server-managed database in the ASMDS by routing SQL statements through the application server, the method comprising:
receiving, from the ODBC driver, an SQL statement by a SQL endpoint in the application server;
handling the SQL statement in connection with a design-time configured SQL handler comprising:
a service definition listing objects to be exposed; and
a service binding comprising configuration data to expose said objects;
wherein a SQL service artifact associated with the service binding is generated upon activation of the service binding;
parsing the SQL statement and extracting schema names referenced in the SQL statement;
in response to validating the certificate and determining that data access is permitted, retrieving centralized data corresponding to the SQL statement from a centralized database; and
exposing the service binding to a user as a schema containing the centralized data.

16. The system of claim 15, wherein the computer-executable instructions are further executed to perform: permitting the user to call procedures on the ASMDS using the SQL statement, wherein the objects to be exposed are the procedures performed in the ASMDS.

17. The system of claim 15, wherein the computer-executable instructions are further executed to perform: converting character-based data to semantic data by one of:
converting the character-based data to the semantic data using an ODBC driver within an ODBC-connected application, or
specifying in the SQL statement to convert the character-based data to the semantic data in the ASMDS.

18. The system of claim 15, the computer-executable instructions are further executed to perform: exposing the data from the database via implicit or explicit virtual tables in an ODBC-connected application.

19. The system of claim 15, wherein the computer-executable instructions are further executed to perform: limiting user access to the SQL endpoint based on a user authentication of the user, wherein the user authentication is performed by one of:
submitting valid logon credentials to authenticate the user, or
receiving a valid Single Sign-On (SSO) token from a third-party identity provider to authenticate the user, or
storing a valid certificate on a SQL Personal Security Environment (PSE) in an ODBC application, and transmitting the valid certificate to the application server along with the SQL statement to authenticate the user, or
storing a valid certificate on the application server, and matching the valid certificate to a SQL PSE in an ODBC application.

20. The system of claim 19, wherein the computer-executable instructions are further executed to perform: limiting access to SQL services based on authorization of the user by:
- checking the user's authorization for the SQL service artifact;
- resolving the service definition associated with the SQL service artifact;
- checking the objects in the SQL statement against the exposed objects from the service definition;
- wherein the exposed objects not listed in the service definition are not accessible; and
- performing record-level authorizations based on a resulting set of objects.

* * * * *